UNITED STATES PATENT OFFICE.

ISAIAH L. ROBERTS, OF BROOKLYN, NEW YORK, ASSIGNOR OF ONE-HALF TO HENRY L. BREVOORT, OF SAME PLACE.

ELECTRIC BATTERY.

SPECIFICATION forming part of Letters Patent No. 311,853, dated February 3, 1885.

Application filed May 29, 1884. (No model.)

*To all whom it may concern:*

Be it known that I, ISAIAH L. ROBERTS, a citizen of the United States, residing in the city of Brooklyn, county of Kings, and State of New York, have made a new and useful Improvement in Electric Batteries, of which the following is a specification, and which is sufficient to enable others skilled in the art to practice my invention.

My invention relates to a battery solution to be used in a battery having zinc and carbon elements, such as are at present sold in the market and used, principally, with a solution of sal-ammoniac and water. It is well known that almost all solutions operate in some degree to produce electricity in a battery-cell of this class, even water, and it has generally been observed that sal-ammoniac is the best solution for this purpose. The difficulties experienced with cells of this construction, and using sal-ammoniac as a solution, is the rapid polarization of the battery, and its consequent inability to furnish a current of much power for a sufficient length of time.

My invention consists in adding to such sal-ammoniac solution a soluble depolarizer—for example, a mixture of bichromate of potash and permanganate of potash. If sal-ammoniac is the base of the exciting solution, I use sal-ammoniac, bichromate of potash, and permanganate of potash, preferably in such proportions that when the desired quantity of water is added a few crystals of sal-ammoniac, bichromate of potash, and permanganate of potash will remain undissolved in excess of those taken into solution. In place of sal-ammoniac, I can use any solution other than an acid solution, and improve it by adding the materials above referred to, though I prefer to use them when combined with the chloride of an alkali in water, such as common table-salt or the like. The materials which I add to the solution are practically, when dissolved, liquid depolarizers, and take the place of the solid blocks or non-soluble depolarizing materials used in some batteries, such as bricks of peroxide of manganese, used in the Leclanché cell, and other non-soluble depolarizers.

No claim is made in this patent to any depolarizers other than those which are soluble, and which go into solution with the base of the exciting-liquid used.

What I claim, and desire to secure by Letters Patent, is—

1. In a battery, the combination of permanganate of potash and bichromate of potash, substantially as described.

2. In a battery, the combination of permanganate of potash and bichromate of potash, as depolarizers, with a non-acid solution, substantially as described.

3. In a battery having zinc and carbon elements, the combination of bichromate of potash and permanganate of potash, used as depolarizers, substantially as described.

4. In a battery, the combination, with an exciting solution consisting of the chloride of an alkali dissolved in water, of bichromate of potash and permanganate of potash, substantially as described.

ISAIAH L. ROBERTS.

Witnesses:
JOSEPH L. LEVY,
A. J. LEHMAN.